(12) United States Patent
Wang et al.

(10) Patent No.: US 7,172,125 B2
(45) Date of Patent: Feb. 6, 2007

(54) GAIN CONTROL SYSTEM AND METHOD FOR USE IN ELECTRO-OPTICAL READERS

(75) Inventors: Dayou Wang, Port Jefferson Station, NY (US); Matthew D. Blasczak, Coram, NY (US); Edward Barkan, Miller Place, NY (US); Vladimir Gurevich, Stony Brook, NY (US); Pierre Craen, Southampton, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 176 days.

(21) Appl. No.: 10/832,486

(22) Filed: Apr. 26, 2004

(65) Prior Publication Data

US 2005/0236485 A1    Oct. 27, 2005

(51) Int. Cl.
*G06K 7/10* (2006.01)
(52) U.S. Cl. .............................. 235/462.26; 235/462.25
(58) Field of Classification Search ........... 235/462.26, 235/462.27, 462.28, 462.25
See application file for complete search history.

(56) References Cited

U.S. PATENT DOCUMENTS

| | | | |
|---|---|---|---|
| 4,528,444 A * | 7/1985 | Hara et al. ............. | 235/462.26 |
| 5,168,148 A * | 12/1992 | Giebel ................... | 235/462.26 |
| 5,528,022 A * | 6/1996 | Nakazawa .................. | 235/436 |
| 5,563,955 A * | 10/1996 | Bass et al. ................... | 382/101 |
| 5,612,529 A * | 3/1997 | Coleman .................... | 235/455 |
| 5,734,152 A * | 3/1998 | Goren et al. ........... | 235/462.27 |
| 5,818,528 A * | 10/1998 | Roth et al. .................. | 348/364 |
| 5,825,011 A * | 10/1998 | Suzuki et al. .......... | 235/472.01 |
| 5,914,478 A * | 6/1999 | Bridgelall .............. | 235/462.25 |
| 6,073,848 A * | 6/2000 | Giebel ................... | 235/462.26 |
| 6,811,087 B2 * | 11/2004 | Nakamura et al. ..... | 235/462.26 |
| 6,827,272 B2 * | 12/2004 | Kolstad ...................... | 235/470 |

\* cited by examiner

*Primary Examiner*—Ahshik Kim
(74) *Attorney, Agent, or Firm*—Kirschstein, et al.

(57) ABSTRACT

An intelligent gain selection circuit replaces the gain set by an automatic gain control circuit in an electro-optical reader for reading indicia, such as bar code symbols, with a larger gain where specular reflections, high contrast edges, or other noise operative to produce dominant high voltage peaks in an analog signal generated by a sensor in the reader, are detected.

8 Claims, 4 Drawing Sheets

GAIN CONTROL SYSTEM AND METHOD FOR USE IN ELECTRO-OPTICAL READERS

BACKGROUND OF THE INVENTION

1. Field of the Invention

The present invention generally relates to electro-optical readers for reading indicia such as bar code symbols and, more particularly, to an intelligent gain control system for such readers.

2. Description of the Related Art

Electro-optical readers typically employ an automatic gain control (AGC) circuit to maintain a desired constant signal envelope on an analog electrical signal generated by a sensor operative for detecting light scattered off indicia, e.g., a bar code symbol having a series of bars of various widths spaced apart from one another to bound spaces of various widths, the bars and spaces having different light reflecting characteristics and being arranged in groups according to a set of rules and definitions specified by a code or symbology to form characters to be read.

This analog signal, also known as an analog bar pattern (ABP) signal, has voltage peaks corresponding to the edges between the bars and spaces of the physical symbol. The known AGC circuit includes a voltage peak detector for determining the peak-to-peak voltage of the ABP signal, and then alters the gain for the analog signal until the peak-to-peak voltage fits into a predetermined voltage range. Hence, AGC gain settings are largely determined by the maximum voltage peaks in the ABP signal and works well when the voltage peaks corresponding to symbol edges are relatively high compared to voltage peaks corresponding to non-symbol edges, for example, electrical noise peaks or specular reflection peaks, but works poorly when the non-symbol voltage peaks are significantly higher than the symbol voltage peaks. Indeed, the AGC circuit would set the gain too low to decode a symbol when the symbol voltage peaks are significantly smaller than the non-symbol voltage peaks.

FIG. 1 depicts a voltage-versus-time graph of an ABP signal generated by scanning a high contrast, low density bar code symbol in accordance with the prior art against a high contrast, uniform, non-specularly reflective background. The term "high contrast" refers to 80% minimum mean reflective distance (MRD), and the term "low density" identifies a symbol where the working range of the reader is limited by the amount of reflected signal and by the resulting signal-to-noise ratio, rather than being limited by the divergent focusing profile of the laser beam. Typically, a 55 mil dimension for a bar or space element is considered a low density symbol. The AGC circuit sets the gain for the ABP signal based on the detected maximum peak-to-peak voltage and works very well in decoding the symbol over working ranges over ten feet from the reader.

However, this nominal performance is degraded in the presence of specular reflections where there are a few very bright spots in the field of view of the sensor, the bright spots being brighter than the scattered light returned from the symbol. FIG. 2 depicts a voltage-versus-time graph of an ABP signal generated by the same symbol as discussed above for FIG. 1, but this time the ABP signal has specular reflections whose non-symbol voltage peaks are larger than the symbol voltage peaks. These larger non-symbol voltage peaks causes the AGC circuit to attenuate the ABP signal to the point where the symbol voltage peaks are too small to decode.

Another related example regards scanning a low contrast symbol, even if no specular reflections are present. Symbols having a low contrast between their bars and spaces have smaller voltage peaks in the ABP signal, requiring more gain, similar to a low density, high contrast symbol at the end of its working range. High contrast edges in the background of the symbol, but still within the scan line, can set the gain of the AGC circuit too low, again causing the AGC circuit to attenuate the ABP signal to the point where the symbol edge peaks are too small to decode.

SUMMARY OF THE INVENTION

Objects of the Invention

Accordingly, it is a general object of this invention to improve the decodability of symbols in the presence of specular reflections and/or high contrast edges.

More particularly, it is an object of the present invention to intelligently differentiate between symbol voltage peaks and non-symbol voltage peaks.

Still another object of the present invention is to adjust gain in an electro-optical reader based on symbol voltage peaks.

FEATURES OF THE INVENTION

In keeping with the above objects and others which will become apparent hereinafter, one feature of the present invention resides, briefly stated, in a gain control system for use in an electro-optical reader operative for reading indicia. The system includes an automatic gain control (AGC) circuit for determining voltage peaks in an analog electrical signal generated by the reader, and for setting a gain to amplify the analog signal based on the voltage peaks determined by the AGC circuit; and an intelligent gain selection (IGS) circuit for detecting and differentiating between indicia voltage peaks derived from the indicia and non-indicia voltage peaks not derived from the indicia, and for controlling the AGC circuit to replace the gain set by the AGC circuit with a predetermined larger gain when non-indicia voltage peaks have been detected, and to use the gain set by the AGC circuit when non-indicia voltage peaks have not been detected.

The system includes a digitizer for digitizing the analog signal to obtain a digitized signal, and a peak detector for detecting the indicia voltage peaks and the non-indicia voltage peaks. The IGS circuit constructs from the indicia voltage peaks and the non-indicia voltage peaks a histogram in which the number of voltage peaks is counted against voltage peak strength. The IGS circuit determines a dynamic threshold value midway in a range between the smallest and the largest peak strength. Then, the IGS circuit compares a total number of voltage peaks above the dynamic threshold with a reference number and, if the total number is less than the reference number, then the IGS circuit determines that non-indicia voltage peaks are present in the analog signal.

According to this invention, the IGS circuit replaces said gain with said predetermined larger gain when the comparison is met. The IGS circuit uses said gain set by the AGC circuit when the comparison is not met.

Thus, the IGS circuit adjusts the gain not by the maximum peak voltage of the analog signal, but by the maximum peak voltage of the indicia voltage peaks. Non-indicia voltage peaks, such as caused by specular reflections and/or high contrast edges, will no longer dominate the gain setting made by the AGC circuit.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
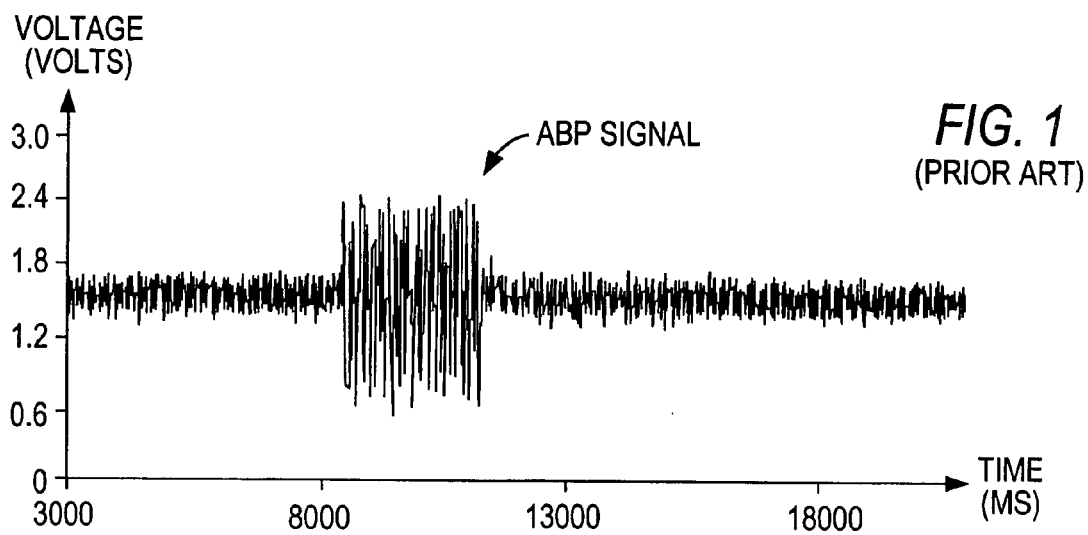
FIG. 1 is a voltage-versus-time graph of an ABP signal generated by scanning a high contrast, low density, bar code symbol against a high contrast, uniform, non-specularly reflective background according to the prior art.
Figure 2:
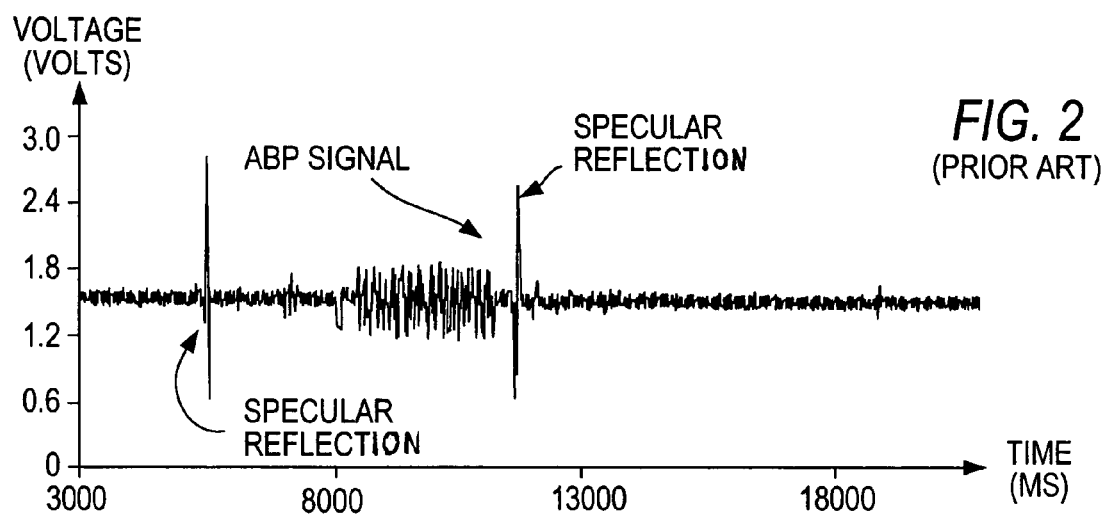
FIG. 2 is a voltage-versus-time graph of the ABP signal of FIG. 1 in the presence of specular reflections according to the prior art.
Figure 3:
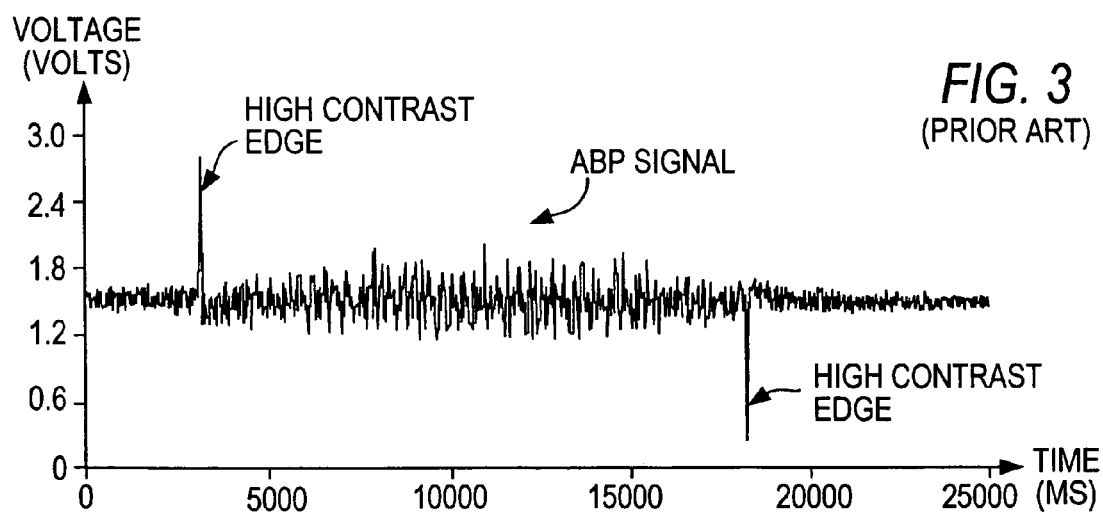
FIG. 3 is a voltage-versus-time graph of an ABP signal generated by scanning a low contrast symbol having high contrast edges according to the prior art.
Figure 4:
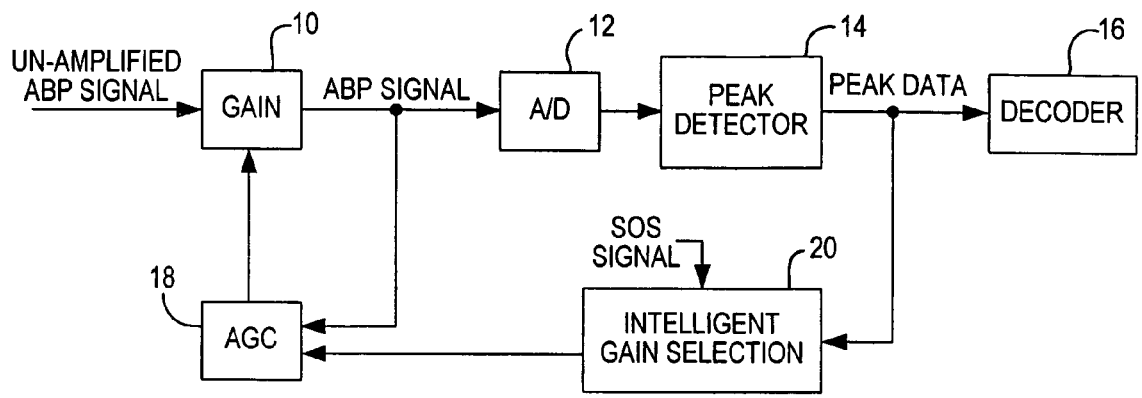
FIG. 4 is a block diagram depicting an intelligent gain selection circuit in a gain control system according to this invention.

Referring to FIG. 4, an unamplified ABP signal from a sensor of an electro-optical reader is passed through an amplifier 10 having a gain to a digitizer comprising an analog-to-digital (A/D) converter 12 and a peak detector 14 to generate a digitized signal which is processed by a decoder 16. The gain of the amplifier 10 is controlled by an automatic gain control (AGC) circuit 18 which has an internal peak detector for detecting voltage peaks in the ABP signal, and for setting the gain according to the maximum peak-to-peak voltage detected in the ABP signal. As described above in connection with FIGS. 2–3, the AGC circuit 18 is sensitive to non-symbol voltage peaks such as caused by the specular reflections of FIG. 2 or the high contrast edges of FIG. 3, and the AGC circuit 18 will set the gain by the maximum peak-to-peak voltages which are dominated by the larger, non-symbol voltage peaks. The AGC circuit will therefore sometimes set the gain too low and may prevent the symbol from being successfully decoded and read.

As described so far, the block diagram of FIG. 4 is entirely conventional. This invention proposes the addition of an intelligent gain selection (IGS) circuit 20 operative for intelligently differentiating the symbol voltage peaks from the non-symbol voltage peaks, and for causing the gain to be adjusted not by the maximum peak-to-peak voltage of the ABP signal, but by the maximum peak-to-peak voltage of the symbol voltage peaks within a scan.

As described below, characteristics of the symbol peaks and the non-symbol peaks from the digitized signal are analyzed, and then an output is generated to the AGC circuit 18 to allow an appropriate gain to be set. When the IGS circuit 20 determines that the symbol peaks are larger than the non-symbol peaks, then the maximum peak detected signal is appropriate for controlling the AGC circuit. When the IGS circuit 20 determines that the non-symbol peaks are larger than the symbol peaks, then the maximum peak detected signal is no longer appropriate for controlling the AGC circuit, and the output from the IGS circuit 20 takes priority and causes the AGC circuit to set an appropriate gain. If no symbol peaks are detected, then the IGS circuit may increase the gain until symbol peaks are detected, and then set appropriate gain settings for decoding.

The beginning of a scan is normally indicated by a start-of-scan (SOS) signal which is derived from a motor that drives a scan mirror operative for reflecting a laser beam toward the symbol to be read. The SOS signal is an input to the IGS circuit 20. New gain settings can either be applied at each new scan, or in a continuous fashion.

Figure 5:
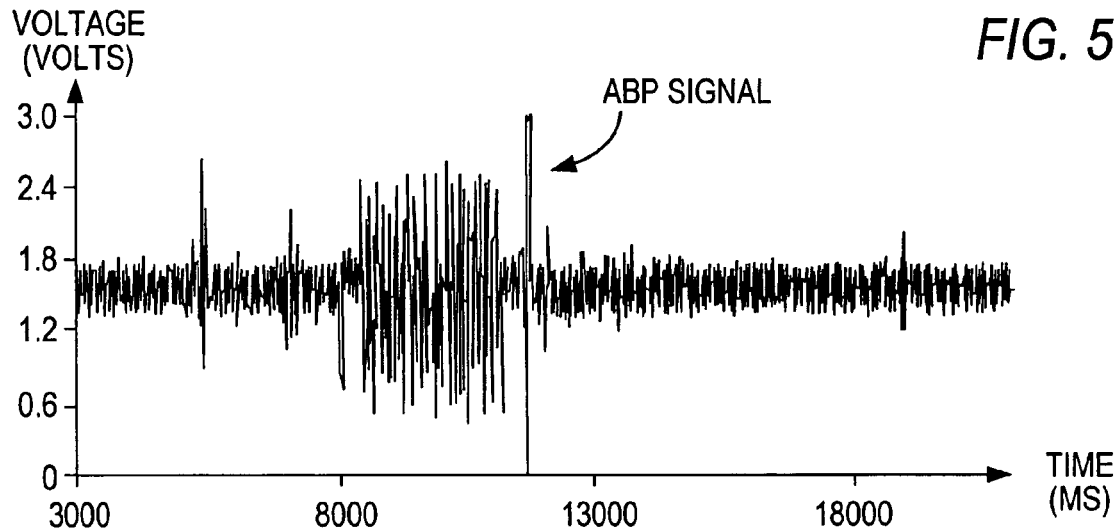
FIG. 5 is a voltage-versus-time graph of the ABP signal of FIG. 2 after gain adjustment according to this invention.
Figure 6:
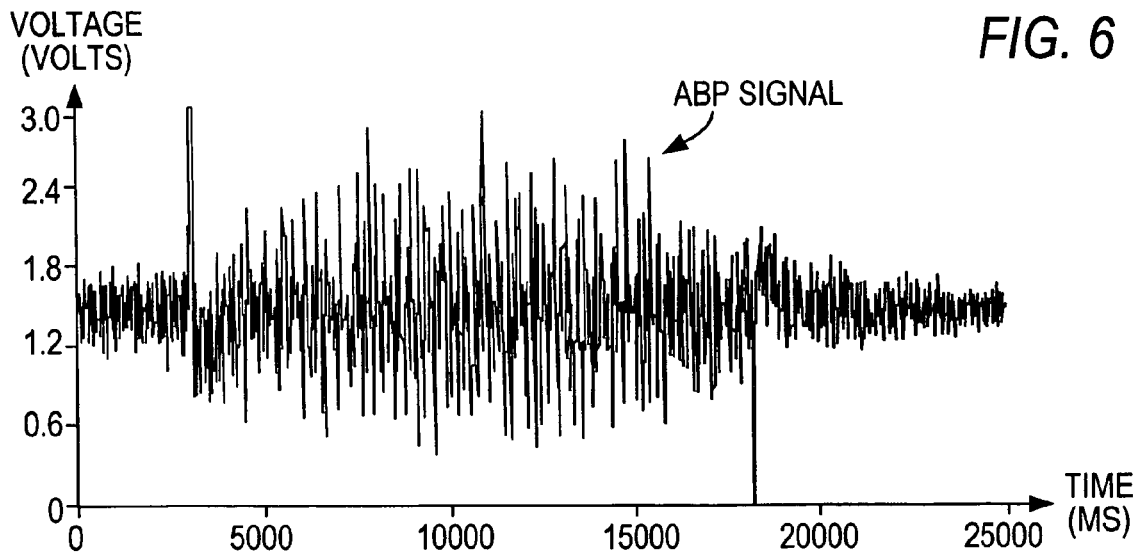
FIG. 6 is a voltage-versus-time graph of the ABP signal of FIG. 3 after gain adjustment according to this invention.

FIG. 5 shows the same signal as discussed above in connection with FIG. 2, but after gain adjustment provided by the IGS circuit 20. FIG. 6 shows the same signal as discussed above in connection with FIG. 3, but after gain adjustment provided by the IGS circuit 20. In both cases, the symbol is now decodable despite the presence of the specular reflections and the high contrast edges.

Figure 7:
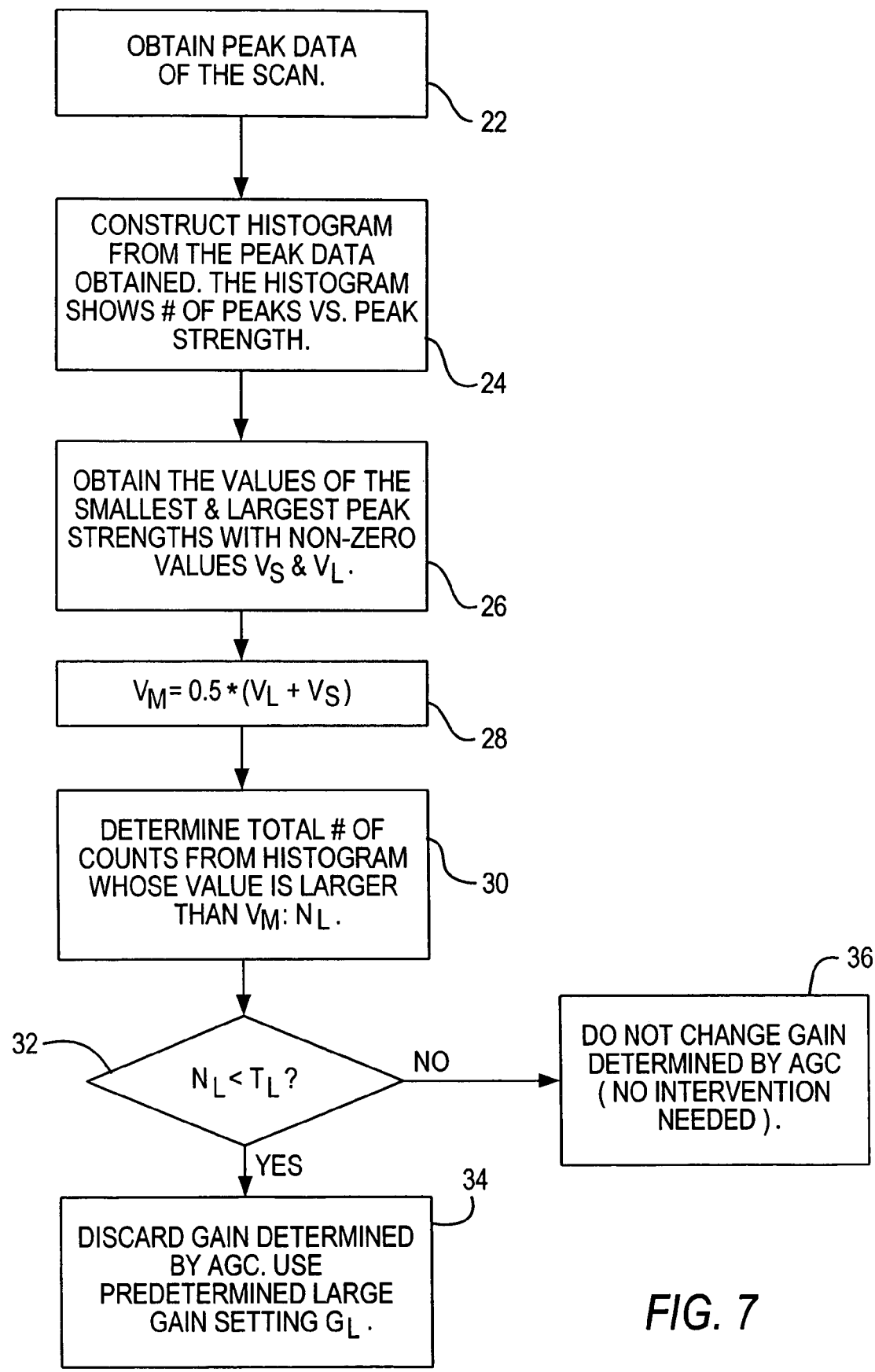
FIG. 7 is a flow chart depicting operation of the intelligent gain selection circuit of FIG. 4.
Figure 8:
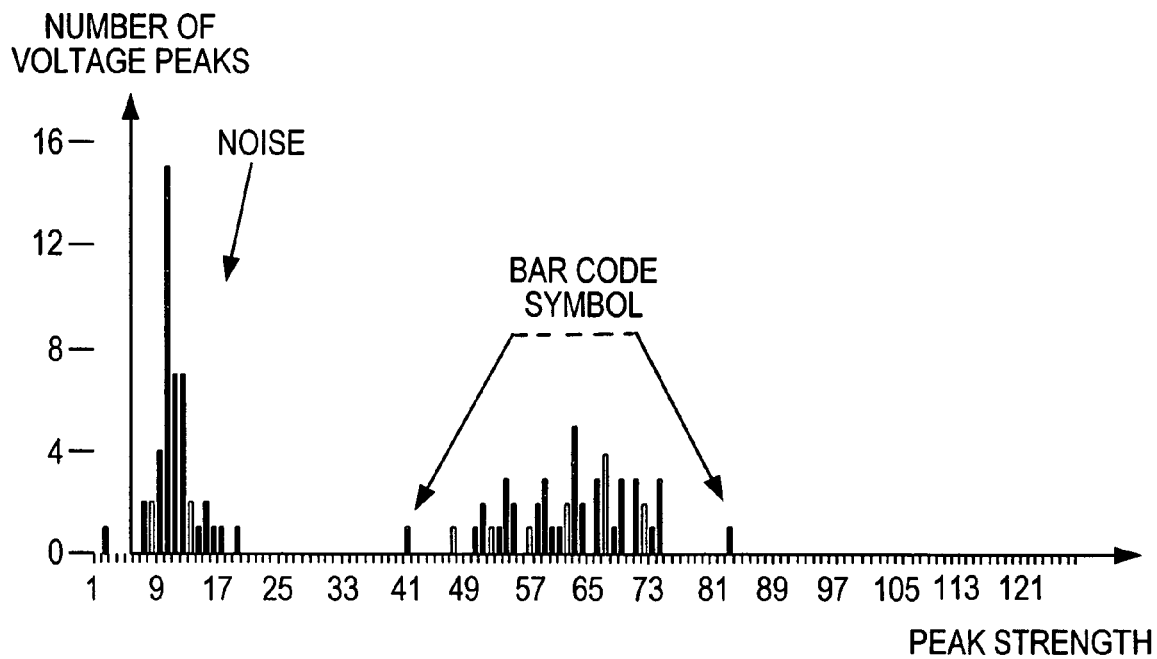
FIG. 8 is a histogram of the number of voltage peaks versus peak strength of a bar code symbol not in the presence of specular reflections.

FIG. 7 is a flow chart depicting operation of the IGS circuit 20. The voltage peak data of the ABP signal is obtained in step 22. Next, in step 24, a histogram is constructed from the voltage peak data. Generally speaking, a histogram is a collection of frequency of occurrence of a parameter within a range. In this case, the parameter is the voltage peak strength. As shown in FIG. 8, the range of the voltage peak strength is 128 steps and varies from 0 to 127 along the X-axis. The occurrence frequency or number or count of voltage peaks is plotted along the Y-axis.

FIG. 8 depicts a histogram from a representative bar code symbol without specular reflection and reflects the distribution of signal strength. It is noted that the symbol peaks are clustered near the center of the plot between peak strengths 41 to 83, and that background noise is clustered toward the left between peak strengths 1 to 20.

Figure 9:
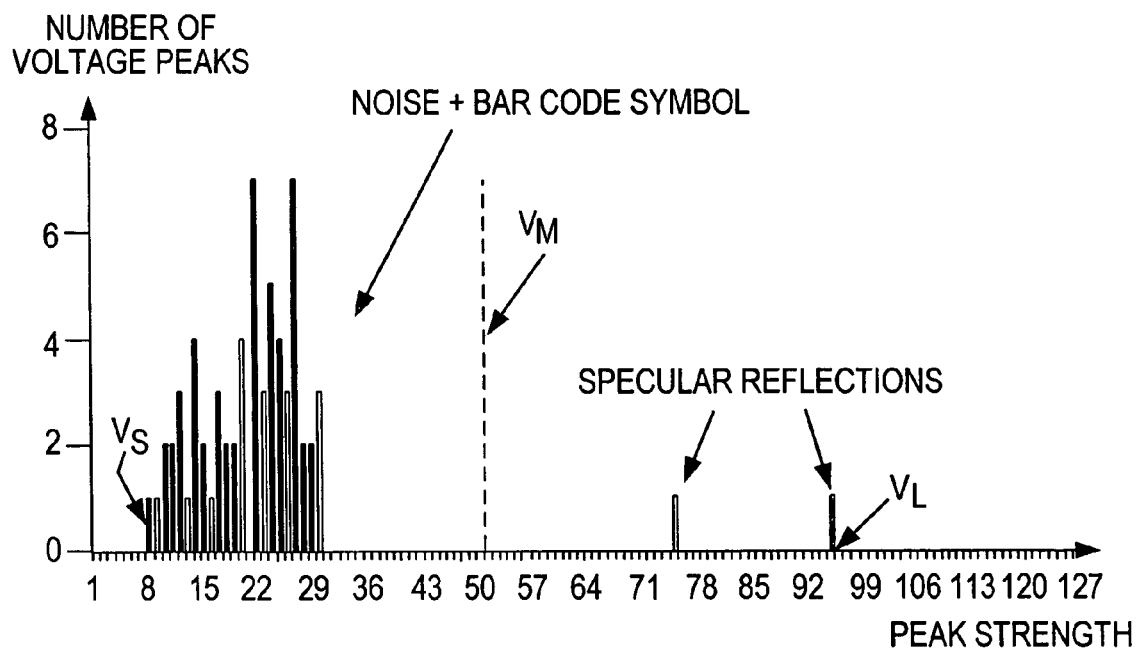
FIG. 9 is analogous to FIG. 8, but in the presence of specular reflections.

By contrast, FIG. 9 depicts a histogram from the symbol of FIG. 8 but in the presence of specular reflections. It is noted that the histogram of FIG. 9 is quite different from that of FIG. 8, in that the symbol and the noise are located toward the left, and the specular reflections are isolated and located toward the right at peak strengths 75 and 94, respectively, well away from the noise and symbol data which are clustered between peak strengths 8 through 31.

In order to differentiate between the noise and symbol data on the one hand, and the specular reflections on the other hand, the value of the largest peak strength ($V_L$) and the value of the smallest peak strength ($V_S$) are obtained in step 26. In FIG. 9, $V_L$ corresponds to peak strength 94, and $V_S$ corresponds to the peak strength 8.

Next, in step 28, the largest and smallest values are averaged to obtain a threshold value $V_M$, which is 51. The number of peaks below this threshold value represents the symbol and noise, while the number of peaks ($N_L$) above this threshold value represents the specular reflections, and is determined in step 30.

In comparison step 32, a reference value $T_L$ is used. $T_L$ is a small number obtained heuristically and, in this example, $T_L$ equals 8. The number of peaks $N_L$ representing the specular reflections is compared to $T_L$ and if $N_L < T_L$, this indicates the presence of specular reflections.

If this condition is met, step 34 is performed and the gain determined by the AGC circuit 18 is discarded, and a predetermined large gain setting $G_L$ is used instead. The effect of this large gain setting is depicted in FIG. 5 and enables the symbol to be decoded. If this condition is not met, then step 36 is performed and the gain determined by the AGC circuit is used without intervention by the IGS circuit 20.

It will be noted that the threshold value $V_M$ is a dynamic value and changes from scan to scan. This adaptive technique is much more robust to signal strength variation due to working range, symbol contrast, etc.

It will be further noted that the IGS circuit works in the presence of specular reflections and does not discard any data accumulated during a scan. Gain is adjusted by the maximum peak-to-peak voltage of the symbol peaks in the ABP signal during each scan, and not by the maximum peak-to-peak voltage of the non-symbol peaks. Decodability is increased, and faster decoding is achieved not only for readers that sweep a single scan line across a symbol, but also for omni-directional readers.

Another way to adjust amplifier gain to compensate for differences in analog signal levels that result from scanning symbols of various print contrasts, or located at different working distances, or degraded by specular reflections, is to allow the AGC circuit 18 to adjust the gain based only on the analog signal produced by whatever is close to the center of the scan line, and to have the AGC circuit ignore whatever is not near the center of the scan line. This works well because users of handheld readers generally position the symbol to be read near the center of the scan line.

Then, in the case of a moving laser beam reader, the center of the scan line is located by measuring the time from one SOS signal to the next, and dividing the measured time in half. The AGC circuit can be disabled throughout the scan line except for a few milliseconds on either side of the center of the scan line. The exact time duration that the AGC circuit should be disabled depends on the frequency of the scan motor drive and the percentage of the scan line over which it is desired to have the AGC circuit function. For example, if it is desired to have the AGC circuit function only for a time duration that is 15% of the total scan period, then the decode microprocessor, which already monitors the SOS signal, performs the calculation and enables or disables the AGC circuit at the calculated time.

In the case of an imaging scanner that uses an array of imaging sensors, rather than a moving laser beam, to read a symbol, the AGC circuit can be enabled only when the sensors near the center of the array are being read out.

Another way to prevent system degradation due to specular reflections is to use a non-differentiated ABP signal. Voltage peaks derived from the bars will be negative, whereas signal speaks from artifacts surrounding the symbol will be positive. The AGC system can be controlled to operate only in response to negative peaks, thereby removing the influence of non-symbol, positive peaks.

Another approach is to control the reader to start with a minimum gain setting. If the symbol is close to the reader, the symbol will be decoded. If the symbol is not decoded, then the reader can switch to a maximum gain. If the symbol is still not decoded, then the AGC circuit 18 can be actuated.

Still another approach is to place a polarizer in front of the sensor to reduce the specular reflections, although at the expense of reducing the working range of the reader.

An additional technique to reduce the effect of specular reflections is to switch the laser source, that emits the laser beam in a moving beam reader, off while not scanning the symbol and on when the laser beam is on the symbol.

It will be understood that each of the elements described above, or two or more together, also may find a useful application in other types of constructions differing from the types described above.

While the invention has been illustrated and described as embodied in a gain control system and method for use in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A gain control system for use in an electro-optical reader operative for scanning indicia, comprising:
   a) an automatic gain control (AGC) circuit for determining voltage peaks in an analog electrical signal generated by the reader, and for setting a gain to amplify the analog signal based on the voltage peaks determined by the AGC circuit; and
   b) a gain controller for enabling operation of the AGC circuit only during a central part of each scan of the indicia.

2. A gain control system for use in an electro-optical reader operative for scanning indicia, comprising:
   a) an automatic gain control (AGC) circuit for determining voltage peaks in an analog electrical signal generated by the reader, and for setting a gain to amplify the analog signal based on the voltage peaks determined by the AGC circuit; and
   b) a gain controller for enabling operation of the AGC circuit only when the voltage peaks are negative.

3. A gain control system for use in an electro-optical reader operative for reading indicia, comprising:
   a) an automatic gain control (AGC) circuit for determining voltage peaks in an analog electrical signal generated by the reader, and for setting a gain to amplify the analog signal based on the voltage peaks determined by the AGC circuit;
   b) a digitizer for digitizing the analog signal to obtain a digitized signal, and a peak detector for detecting indicia voltage peaks derived from the indicia and non-indicia voltage peaks not derived from the indicia; and
   c) an intelligent gain selection (IGS) circuit for detecting and differentiating between the indicia voltage peaks and the non-indicia voltage peaks, and for controlling the AGC circuit to replace the gain set by the AGC circuit with a predetermined larger gain when non-indicia voltage peaks have been detected, and to use the gain set by the AGC circuit when non-indicia voltage peaks have not been detected, the IGS circuit constructing from the indicia voltage peaks and the non-indicia voltage peaks a histogram in which the number of voltage peaks is counted against voltage peak strength, the IGS circuit determining a dynamic threshold value in a range between smallest and largest peak strengths, the dynamic threshold value being an average of the smallest and largest peak strengths, the IGS circuit comparing a total number of voltage peaks above the dynamic threshold with a reference number and, if the total number is less than the reference number, then the IGS circuit determines that non-indicia voltage peaks are present in the analog signal.

4. The system of claim 3, wherein the IGS circuit replaces said gain with said predetermined larger gain when the comparison is met.

5. The system of claim 3, wherein the IGS circuit uses said gain set by the AGC circuit when the comparison is not met.

6. A method of gain control in an electro-optical reader operative for reading indicia, comprising the steps of:
  a) determining voltage peaks in an analog electrical signal generated by the reader, and setting a gain to amplify the analog signal based on the voltage peaks determined;
  b) digitizing the analog signal to obtain a digitized signal, and detecting indicia voltage peaks derived from the indicia and non-indicia voltage peaks not derived from the indicia; and
  c) detecting and differentiating between the indicia voltage peaks and the non-indicia voltage peaks, and replacing the gain with a predetermined larger gain when non-indicia voltage peaks have been detected, and using the gain when non-indicia voltage peaks have not been detected, constructing from the indicia voltage peaks and the non-indicia voltage peaks a histogram in which the number of voltage peaks is counted against voltage peak strength, determining a dynamic threshold value in a range between smallest and largest peak strengths, the dynamic threshold value being an average of the smallest and largest peak strengths, and comparing a total number of voltage peaks above the dynamic threshold with a reference number and, if the total number is less than the reference number, then determining that non-indicia voltage peaks are present in the analog signal.

7. The method of claim 6, and replacing said gain with said predetermined larger gain when the comparison is met.

8. The method of claim 6, and using said gain when the comparison is not met.

* * * * *